United States Patent [19]

Schaetzler et al.

[11] Patent Number: 4,699,421

[45] Date of Patent: Oct. 13, 1987

[54] SLIDING AND LIFTING ROOF

[75] Inventors: Walter Schaetzler, Stockdorf; Bernhard Schleicher, Munich; Richard Igel, Germering; Hans Jardin, Inning, all of Fed. Rep. of Germany

[73] Assignee: Webasto-Werk W. Baier GmbH & Co., Stockdorf, Fed. Rep. of Germany

[21] Appl. No.: 800,446

[22] Filed: Nov. 21, 1985

[30] Foreign Application Priority Data

Nov. 22, 1984 [DE] Fed. Rep. of Germany ....... 3442631

[51] Int. Cl.$^4$ .......................... B60J 7/05; B60J 7/057; B60J 7/185
[52] U.S. Cl. .................................. 296/221; 296/223; 296/224
[58] Field of Search .......................... 296/216, 221–224

[56] References Cited

U.S. PATENT DOCUMENTS

| | | | |
|---|---|---|---|
| 4,403,805 | 9/1983 | Strem, Jr. et al. | 296/221 |
| 4,420,184 | 12/1983 | Kaltz | 296/221 |
| 4,566,730 | 1/1986 | Knabe et al. | 296/221 |
| 4,601,512 | 7/1986 | Boots | 296/221 |

Primary Examiner—Dennis H. Pedder
Attorney, Agent, or Firm—Sixbey, Friedman & Leedom

[57] ABSTRACT

Sliding and lifting roof for vehicles, having a cover, which in its closed position closes a roof opening, which cover is guided on guide tracks parallel to the side edges of the roof opening, connected with an actuating member by way of a lifting mechanism which is adjustable in a direction relative to the displacement of the cover, and which can be raised above the fixed roof surface by displacing the actuating member, or can be slidably displaced after lowering below the fixed roof surface. The lifting mechanism has a sliding retaining bracket and a lifting lever, that are relatively displaceable by the actuating member. The lifting lever, at one end, is connected with the cover and at an opposite end is pivotably supported about a shaft and is longitudinally and slidably guided by a limited distance in the direction of cover displacement, with respect to the sliding retaining bracket. Furthermore, the sliding retaining bracket has an elongated cam surface and an elongated guide track that define a fixed path of movement for the lifting lever in conjunction with follower rollers carried by the lifting lever which travel along the length of the cam surface and guide track, the cam surface and guide track being provided, at least in part, along the length of a finger-shaped bracket element of the retaining bracket.

20 Claims, 14 Drawing Figures

SLIDING AND LIFTING ROOF

The invention relates to a sliding and lifting roof construction for vehicles, having a rigid cover, which in its closed position, closes a roof opening in a fixed roof surface, which cover is slidably mounted on guide tracks that extend parallel to the side edges of the roof opening, and which is connected with at least one actuating member by way of a lifting mechanism in a manner that, by moving of the actuating member, the cover can either be tiltably raised by lifting of its rer edge above the fixed roof surface, or longitudinally displaced by lowering of its rear portion beneath the fixed roof surface. In particular, such a construction where the lifting mechanism has a link in the form of a sliding retaining bracket that is reciprocally adjustable with the actuating member, and has a lifting lever which is connected with the cover, in the area of one end, so as to be pivotably rotatably about a shaft and, in the area of its other end, is longitudinally adjustable by a predetermined distance in the sliding cover displacement direction while also being pivotably rotatable relative to the slideable retaining bracket. Also, wherein the lifting lever is connected with the sliding retaining bracket for pivotal movement along an additional fixed path, the lifting lever having a follower coacting with cam surface.

Such a sliding and lifting roof is disclosed in U.S. patent application Ser. No. 530,716, filed Sept. 9, 1983, now U.S. Pat. No. 4,566,730. The additional fixed path imposes a predetermined pivotal position relative to the retaining bracket upon the lifting lever at least in the area of the cover displacement between the closed cover position and the position where the rear edge of the cover is lowered, for each position of the retaining bracket relative to the guide tracks. As a result, a particularly safe and stable guidance of the cover is ensured. Vibration and rattling noises are effectively suppressed. In this known construction, the lifting lever is provided with a guide slot within which a link pin, mounted to the sliding retaining bracket, is displaced when lowering the cover rear edge from the closed cover position.

As a result of the relative longitudinal movement of both the sliding retaining bracket and the pivot bearing of the lifting lever, on the retaining bracket side, which is superimposed on the pivotal movement of the lifting lever, the length of the lifting arm between this pivot bearing and the link pin is reduced during the transition from the closed to the lowered cover position. The torque moment transferred to the lifting lever by the cam link pin, therefore, is reduced. Thus, the effectiveness of the forced guidance is dependent upon the cover's respective position in such range of adjustment.

Thus, the principal objective of the invention is the refined of a sliding and lifting roof of the kind described, such that the torque exerted by the fixed path onto the lifting lever is substantially independent from the instantaneous position of the roof cover during the transition from the closed to the lowered position.

This objective, in accordance with preferred embodiments of the invention, is achieved by having guide track follower means connected with the lifting lever (instead of a link pin to the sliding retaining bracket) at a distance from the pivot bearing at the lever end near the sliding retaining bracket with a guide track then being formed by the retaining bracket. In the sliding and lifting roof in accordance with the invention, the lever arm located between the pivot bearing at the retaining bracket end of the lifting lever and the guide track follower is substantially constant, and is particularly independent of the longitudinal movement of the sliding retaining bracket relative to the pivot bearing of the lifting lever on the sliding retaining bracket end.

Preferably, the guide track follower is a further distance from the pivot bearing on the retaining bracket end of the lever than from the pivot bearing of the lifting lever at the roof cover end.

In a sliding and lifting roof in which the additional forced path also has a cam surface follower mounted in the area of one end of the lifting lever for moving along a cam surface of the sliding retaining bracket, the guide track, preferably, at least in part, is formed by the inner side of a sliding retaining bracket part whose outer side forms the cam surface for the additional follower. This assures nearly constant leverage of the lever arms, by which arms the two cams act upon the lifting lever in opposite directions, attempting to displace it around the pivot bearing on the retaining bracket side.

If the additional follower is to be a roller, rotatably mounted at the lifting lever, the pivot bearing of the lifting lever at the cover end may simultaneously serve as a bearing for the roller.

The guide track, at least in part of its longitudinal dimension, may be a guide slot, and the guide track follower advantageously may be kept in engagement with the guide track over the entire pivot range of the lifting lever.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
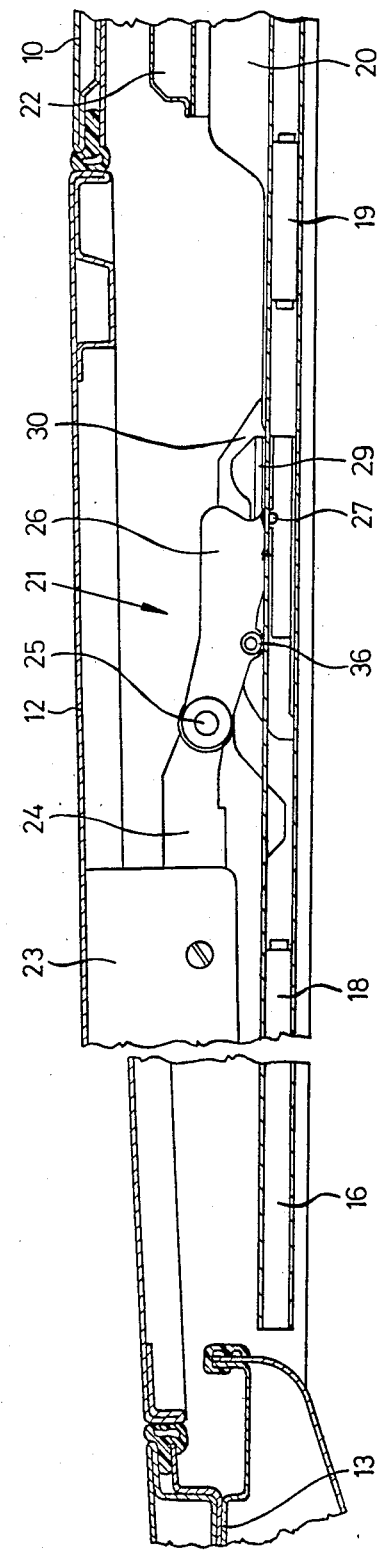
FIG. 1 is a partial longitudinal section through a lifting and sliding roof, showing the cover in a closed position.
Figure 2:
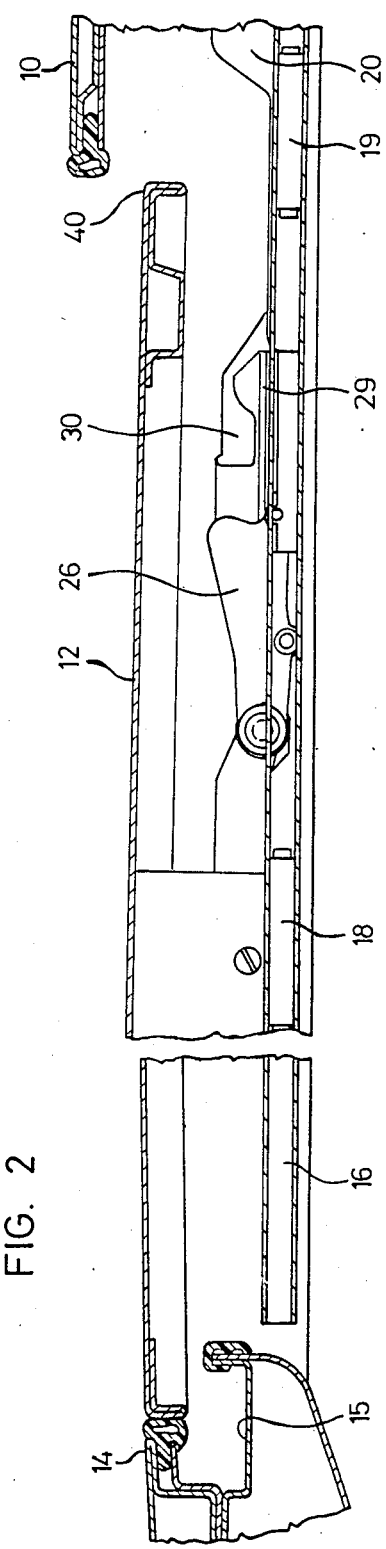
FIG. 2 is a section similar to that according to FIG. 1, but where the rear edge of the cover is lowered.
Figure 3:
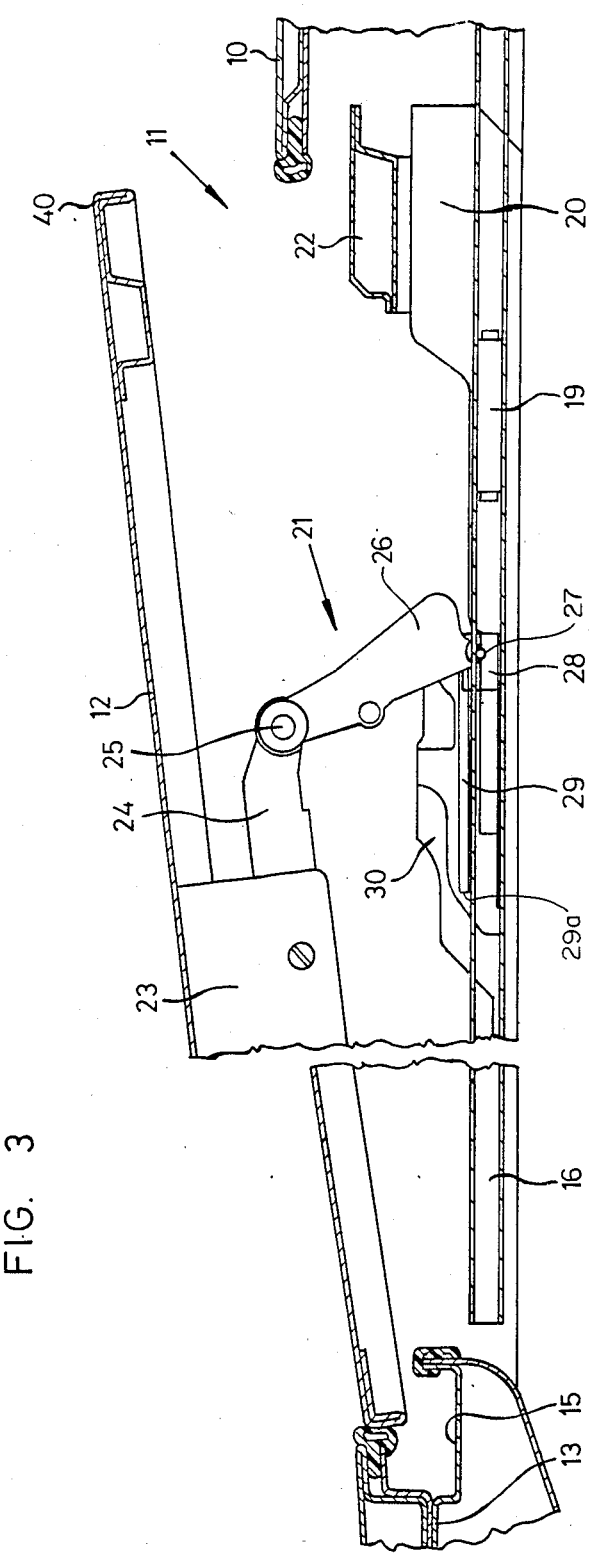
FIG. 3 is a section similar to that according to FIG. 1, but showing the cover with its rear edge raised.

As shown in FIGS. 1–3, a roof opening 11 in a fixed roof surface 10, can be closed or, at least partially, by opened by means of rigid roof cover 12. Roof opening 11 is encircled by a roof frame 13 which forms a rain gutter 15 along front edge 14 and at both sides of the roof opening. A guide rail 16, extending in a longitudinal direction of the vehicle, is mounted at roof frame 13 at each side of roof opening 11. The guide rails, the roof cover, and the operating parts of the lifting and sliding roof, essentially extend in mirror image symmetry relative to a central longitudinal axis of the vehicle. On the basis of such a configuration, the following text is restricted to a description of the operation and design of only one side of the assembly, since such a description applies, therefore, to the other side as well.

Cover 12 travels in known manner (e.g., U.S. Ser. No. 530,716, filed Sept. 9, 1983, now U.S. Pat. No. 4,566,730) in guide rails 16 with one front guide element each, and is pivotably supported about an axis which extends perpendicularly to the sliding direction of the roof cover 12. Such a pivot axis, as is known, could, for instance, be formed by the front guide elements. Slide members 18, 19, mounted to support 20, travel in guide rail 16. Support 20 forms a drive member for a lifting mechanism which is designated 21. Support 20 and its mirror image support on the opposite roof side (not depicted), are connected with each other by way of a transversely extending transport bridge 22. Transport bridge 22 is slidable in a conventional manner in the direction of cover displacement, which direction coincides with the longitudinal direction of the vehicle. For example, a threaded cable which is rigid under pressure essentially engages the center of the transport bridge (see, e.g., U.S. Pat. No. 4,056,274), and is driven by way of a drive motor, preferably an electric motor, or by way of a crank handle.

Roof cover 12 is mounted onto support arm 24 by connecting piece 23. Support arm 24 is hinged at its rear end to one end of a lifting lever 26, by way of pivot bearing 25, which, for example, may be formed by a connecting bolt. The other end of lifting lever 26 is conencted with slider 28 via pivot bearing 27. Slider 28 is longitudinally displaceable by a predetermined distance in a longitudinal slot 29 provide din a side wall of a link in the form of a sliding retaining bracket 30. Bracket 30 is part of a support 20 or is firmly connected therewith. Sliding retaining bracket 30, at the outer side of a forward slide retaining bracket element 32 of a finger-like shape (FIG. 6) has cam surface 33 which can cooperate with a cam follower in the form of a roller 34 that is formed of an elastic material. Pivot bearing 25 simultaneously serves as a bearing for roller 34.

Additionally, lifting lever 26, at the side facing sliding retaining bracket 30, has a laterally extending pin 35 on which a guide track follower, formed by roller 36, is rotatably supported. Roller 36 cooperates with a track 37 which is provided by a recess within sliding retaining bracket 30. Pivot bearing 27, slider 28 and longitudinal slot 29 of sliding retaining bracket 30 form an initial fixed path for movement of lifting lever 26, while an additional fixed path is created by the coaction of roller 36 with track 37, in conjunction with the displaceable movement of roller 34 along cam surface 33. The two fixed paths provide three point contact between lifting lever 26 and sliding retaining bracket 30. The arrangement is designed such that elements 26, 27, 28, and 30 simultaneously experience low pretensioning when roof cover 12 is either lowered (FIG. 2), is in the closed position (FIG. 1), or is at the beginning of the lifting process. On the basis of such pretensioning, the relative movement between lifting lever 26 and sliding retaining bracket 30 is free of play in this adjustment range. Furthermore, it is ensured that, within the described adjustment range, a predetermined pivotal displacement of lifting lever 26, in relation to sliding retaining bracket 30, is producd for every position of transport bridge 22 and, inherently, for every position of the sliding retaining bracket 30.

Figure 4:
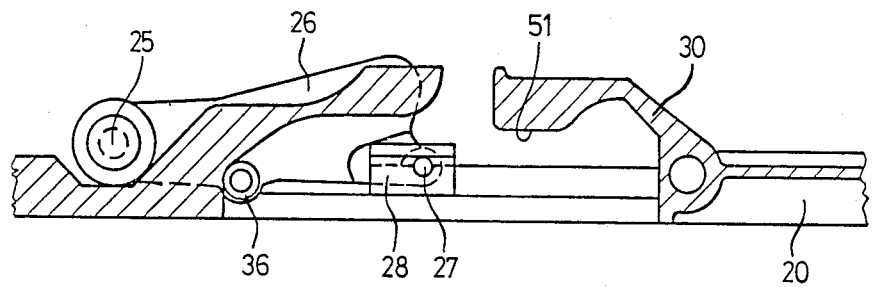
FIGS. 4–8 show a sliding retaining bracket and a lifting lever in different positions of operation.

When roof cover rear edge 40 is lowered (FIG. 2), lifting lever 26 and sliding retaining bracket 30 assume the relative positions according to FIG. 4, wherein the sliding retaining bracket 30 is positioned such that the front end 29a of its longitudinal slot 29 is engaged by slider 28. If support 20 and sliding retaining bracket 30 are pulled rearwardly by displacement of transport bridge 22, cover 12 is, therefore, taken along to thereby, at least partially, open roof opening 11.

Figure 5:
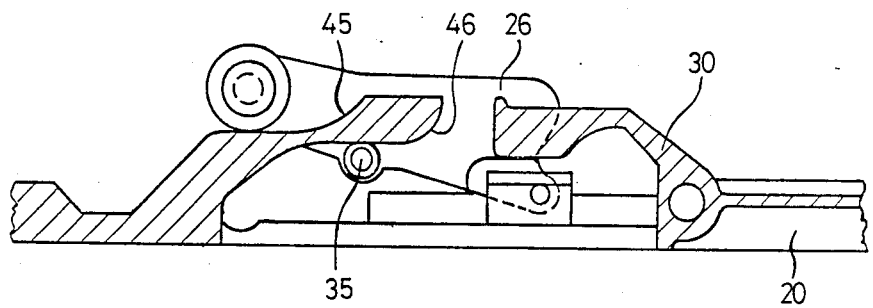

If, however, sliding retaining bracket 30 is moved to the front along with transport bridge 22 from a position according to FIGS. 2 and 4, into the position depicted in FIGS. 1 and 5, longitudinal slot 29 undergoes forward movement with respect to slider 28. At the same time, guide track 37 is displaced relative to roller 36 in such a manner that roller 36 runs along a rearwardly ascending part 41 of guide track 37, while roller 34 moves along an inclined section 42 of cam surface 33. This causes lifting lever 26 to be displaced about pivot bearing 27 in a clockwise direction (FIGS. 1 and 5). Such pivotal movement causes rear edge 40 of the cover 12 to be pushed upwardly while cover 12 executes a pivotal movement in a counter clockwise direction (FIG. 1). As soon as sliding retaining bracket 30 reaches the relative position with respect to lifting lever 26 shown in FIG. 5, and roller 34 has traversed section 42 of cam surface 33 and has proceeded up onto adjacent section 43 (that extends parallel to guide rail 16), the roof cover 12 is in its closed position (FIG. 1) wherein it is essentially flush with fixed roof area 10.

Section 43 of cam surface 33, and part 44 of guide track 37, which likewise is parallel to guide rail 16, define an idle path. During passage through the idle path, the pivotal displacement of lifting lever 26 is kept constant, regardless of the displacement movement of sliding retaining bracket 30 (essentially, a lost motion coupling is formed). The idle path permits considerable tolerances in the operation of the sliding lift roof, without causing adverse effects. If, for instance, while in the relative position in accordance with FIG. 1, a drive motor operating the lifting slide roof is shut off, a lag or over-run does not cause adverse effects. Thus, the timing of the shutoff of the drive motor can be varied within considerable tolerances without causing any ill effects.

Figure 6:
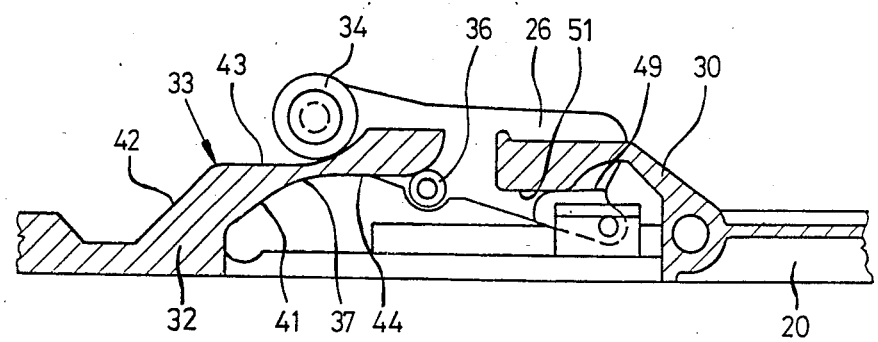

Further movement of sliding retaining bracket 30 from a position according to FIG. 5 into a position according to FIG. 6, causes roller 34 to initiate ascent along cam surface section 45, which is adjacent to section 43 and is inclined. At the same time, roller 36 moves to upwardly inclined tip portion 46 of guide track 37. A lifting movement of cover 12 is thus initiated.

Figure 7:
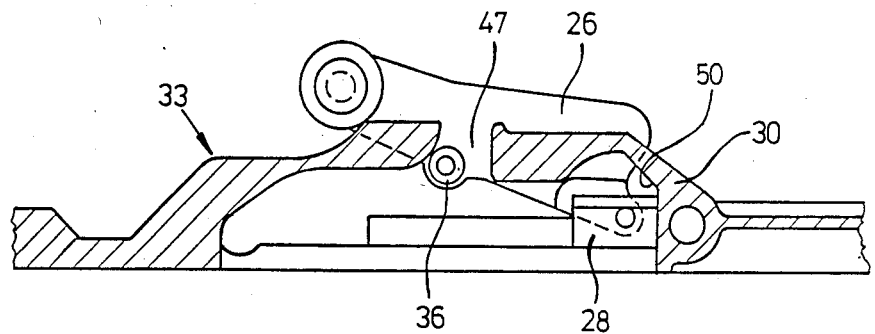

FIG. 7 shows the relative position of lifting lever 26 and sliding retaining bracket 30 subsequent to a smaller further advance movement of support 20. Roller 34 has now reached the upper end of cam track section 45 and roller 36 has reached a point of guide track 37 from which it can subsequently exit through slot 47 of sliding retaining bracket 30. Also, the rear end of longitudinal slot 29 now abuts the back end of slider 28. Because a lost motion coupling is formed by slider 28 and slot 29, during the movement of sliding retaining bracket 30 between the relative positions depicted in FIGS. 4 to 7, the slider 28 merely undergoes its range of lost motion between the ends of slot 29 so that lifting lever 26 executes a purely pivotal movement around the shaft of bearing 27. In other words, pivot bearing 27 maintains a fixed longitudinal position relative to guide rail 16. If sliding retaining bracket 30 is now further advanced to the front via transport bridge 22, starting from a position in accordance with FIG. 7, the rear end of longitudinal slot 29 now interacts with slider 28, causing the lower end of extension lever 26 and pivot bearing 27 to be carried along by sliding and retaining bracket 30 toward the front with respect to guide rail 16. As a result, the end portion of extension lever 26 that is hinged to support 24 moves up (FIG. 8) bringing cover 12 into the raised position shown in FIG. 3.

Figure 8:
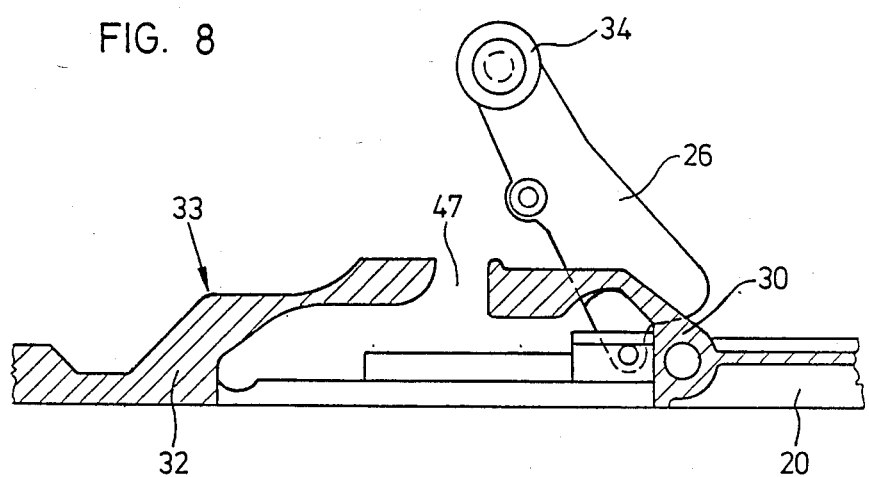

Lifting lever 26, in the proximity of pivot bearing 27, has abutment surface 49 (FIG. 6) which, in the FIG. 8 position, rests against an abutment surface 50 of sliding retaining bracket 30, thereby limiting the swivel movement of lifting lever 26 towards sliding retaining bracket 30. During the displacement of sliding retaining bracket 30 from a position approximating that of FIG. 5, and just prior to reaching a position closely resembling that of the relative position depicted in FIG. 7, abutment surface 49 is displaced with play, relative to surface 51 of sliding retaining bracket 30, which extends parallel to guide rail 16. By way of an example, if during a burglary attempt, sufficient lifting force is applied to cover 12, pin 35 may bend or break off. However, since the abutment area 49 would then engage surface 51, these surfaces, therefore, would serve as additional safeguards against undesirable swinging out of cover 12, thereby preventing unauthorized access to the vehicle interior.

The distance of the axis of roller 34 and pin 35 from the axis of pivot bearing 27 remains constant in every position of lifting lever 26, thereby ensuring a constant lever ratio for the fixed path formed by rollers 34 and 36, in association with cam surface 33 and guide track 37, respectively.

FIGS. 9-14 show a modified embodiment which is similar in design and function to the one described above. Corresponding parts in FIGS. 9-14 are designated with identical reference numerals, preceded by the numeral "1".

While the construction according to the first embodiment causes the roller 36 to lose engagement with guide track 37 shortly after lifting lever 26 begins to lift the cover's back edge (FIG. 7) from a closed roof position, the second embodiment maintains engagement between roller 136 and guide track 137 over the entire range of movement of lifting lever 126. To this end, element 146 of guide track 137 is less inclined than corresponding element 46 of the first embodiment and forms one boundary wall of guide slot 53, whose other boundary wall is defined by an additional element 54 of guide track 137.

Figure 14:
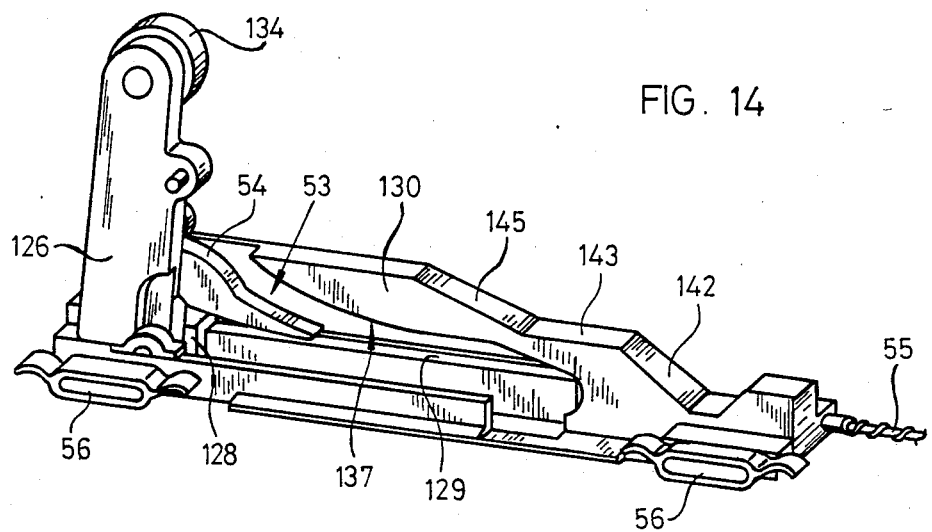
FIG. 14 is a perspective view of a sliding retaining bracket and lifting lever assembly according to a drive utilizing the embodiment of FIGS. 9–13.

Moreover, in the second embodiment, the displacement of sliding retaining bracket 130 is not produced by a transport bridge but is, instead, achieved by way of a pressure-resistant drive cable 55 that acts directly upon sliding retaining bracket 130, which cable 55 may be in the form of a conventional threaded cable. FIG. 14 shows guide shoes 56 extending laterally from sliding retaining bracket 130 to travel longitudinally in guide rails which correspond to guide rails 16.

Figure 9:
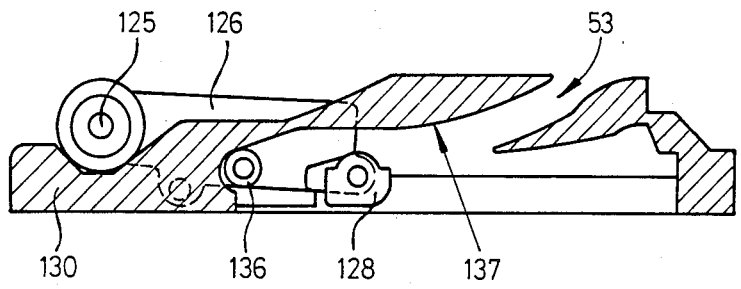
FIGS. 9–13 show a sliding retaining bracket and lifting lever showing different positions of operation of a modified embodiment.
Figure 10:
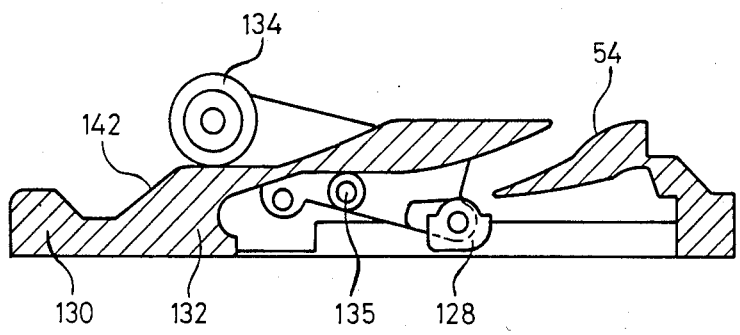
Figure 11:
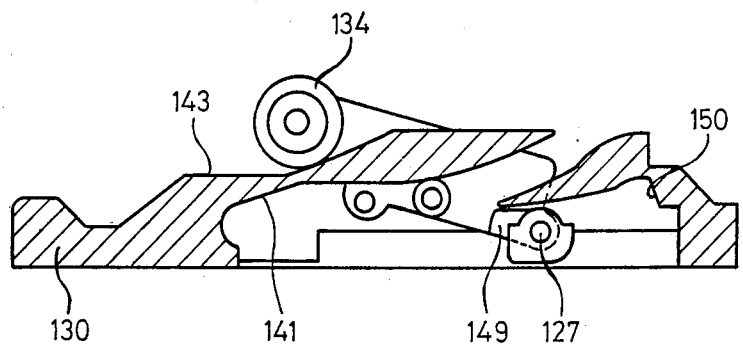

FIG. 9 shows the relative position of lifting lever 126 and sliding retaining bracket 130, when the back edge of cover 12 is lowered beneath fixed roof surface 10. Slider 128 abuts the front end of the longitudinal slot 129, which slot is shown in FIG. 14. If sliding retaining bracket 130 is moved forward, roller 136, pivotally supported on pin 135, travels up inclined surface 141 of guide track 137, while roller 134 on pivot bearing 125, simultaneously moves upwardly along the inclined section 142 of cam surface 133 that is located at the outer side of forward slide bracket element 132, causing lifting lever 126 to be displaced about pivot bearing 127 in a clockwise direction until the roller 134 runs up onto section 143 of cam track 133 (FIG. 10), which is parallel to the guide rail 16. Roller 136 reaches element 144 of guide track 137, which is parallel to section 143, and the cover is in a closed position.

Figure 12:
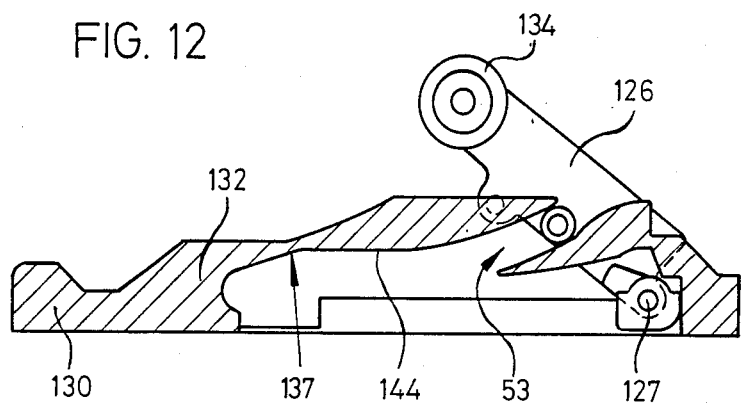
Figure 13:
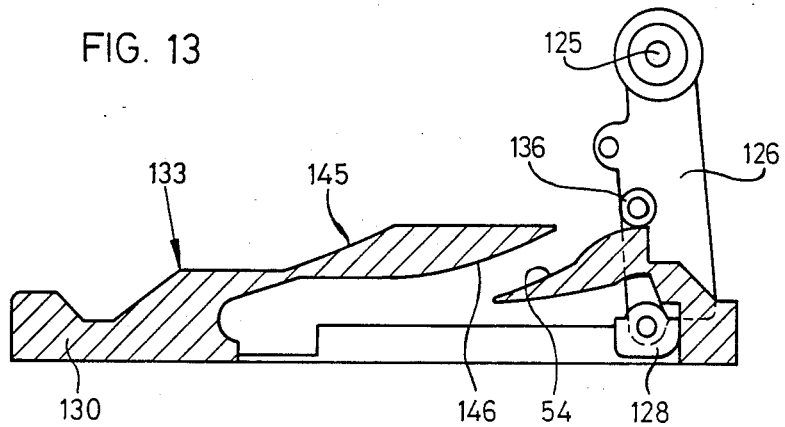

Continued movement of sliding retaining bracket 130 causes roller 134 to move up to the front (FIG. 11) inclined section 145 of cam surface 133. Simultaneously, roller 136 reaches the ascending portion 146 of guide track 137, and the rear edge of cover 12 starts to move up above the fixed roof surface. Roller 134 lifts from cam track 133 at the end of section 145. Roller 136 enters guide slot 53, wherein it is, initially, guided by ascending element 146 on one side, and by a likewise ascending element 54 on the other side (FIG. 12). Roller 136 leaves slot 53 when changing from a position according to FIG. 12 into the position depicted in FIG. 13, where roller 136 is supported by element 54 of guide track 137. Abutment surface 149 (FIG. 11) of lifting lever 126 rests against abutment surface 150 of sliding retaining bracket 130; lifting lever 126 has reached the end of its slide movement, and the roof cover is fully raised While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Sliding and lifting roof for vehicles, having a rigid cover, which in its closed position closes a roof opening in a fixed roof surface, said cover being guided for sliding displacement in guide rails extending along side edges of the roof opening, being connected by way of a lifting mechanism with at least one actuating member that is shiftable in the direction of the cover sliding displacement, and said cover being selectively raised by displacement of the actuating member in a manner lifting a rear edge of the cover above the fixed roof surface, and selectively slidably displaced after lowering of the rear edge below the fixed roof surface, wherein the lifting mechanism has a sliding retaining bracket that is shiftable jointly with the actuating member, and has a lifting lever at each side of the roof opening, said lifting lever being pivotally connected with the cover at one end so that it pivotably rotates about a shaft connected to the cover and at an opposite end being longitudinally movable with respect to the sliding retaining bracket so as to be slidably guided for a limited distance in the direction of cover sliding displacement, wherein the lifting lever is coupled with the sliding retaining bracket for movement along a fixed path so as to control the angular orientation of the lifting lever, said coupling comprising an elongated cam surface and an elongated guide track formed by the sliding retaining bracket, and cam surface follower means and guide track follower means for respectively coacting with the cam surface and the guide track during movement of said cam surface follower means and guide track follower means along the length of the cam surface and guide track, respectively, the guide track follower means being located between the respective ends of the lifting lever, and wherein the retaining bracket has a bracket element of a finger-like shape, said cam surface extending along the length of an upper surface of the bracket element and said guide track extending, at least in part, along the length of an underside and tip portion of the bracket element.

2. Sliding and lifting roof according to claim 1, wherein a distance between the guide track follower means and pivot bearing of an interconnection between the lifting lever and the retaining bracket is larger than a distance of the cam surface follower means from the pivot connection of the lifting lever with the cover.

3. Sliding and lifting roof according to claim 2, wherein the cam surface follower means is located in the area of said one end of the lifting lever.

4. Sliding and lifting roof according to claim 3, wherein the cam surface follower means comprises a roller pivotably supported by the lifting lever, and wherein a pivot bearing of the pivot connection between the cover and the lifting lever simultaneously serves as a bearing for the roller.

5. Sliding and lifting roof according to claim 1, wherein the cam surface follower means is located in the area of said one end of the lifting lever.

6. Sliding and lifting roof according to claim 5, wherein the cam surface follower means comprises a roller pivotably supported by the lifting lever, and wherein a pivot bearing of the pivot connection between the cover and the lifting lever simultaneously serves as a bearing for the roller.

7. Sliding and lifting roof according to claim 6, where the guide track is in the form of, at elast in part of its longitudinal dimension, a guide slot.

8. Sliding and lifting roof according to claim 7, wherein the guide track follower means is kept in engagement with the guide track over the entire range of movement of the lifting lever.

9. Sliding and lifting roof according to claim 8, wherein said guide track follower means comprises a roller.

10. Sliding and lifting roof according to claim 4, wherein said guide track follower means comprises a roller.

11. Sliding and lifting roof according to claim 4, wherein the guide track is in the form of, at least in part of its longitudinal dimension, a guide slot.

12. Sliding and lifting roof according to claim 11, wherein the guide track follower means is kept in engagement with the guide track over the entire range of movement of the lifting lever.

13. Sliding and lifting roof according to claim 3, wherein the guide track is in the form of, at least in part of its longitudinal dimension, a guide slot.

14. Sliding and lifting roof according to claim 13, wherein the guide track follower means is kept in engagement with the guide track over the entire range of movement of the lifting lever.

15. Sliding and lifting roof according to claim 2, wherein the guide track is in the form of, at least in part of its longitudinal dimension, a guide slot.

16. Sliding and lifting roof according to claim 15, wherein the guide track follower means is kept in engagement with the guide track over the entire range of the lifting lever.

17. Sliding and lifting roof according to claim 1, wherein the guide track is in the form of, at least in part of its longitudinal dimension, a guide slot.

18. Sliding and lifting roof according to claim 17, wherein the guide track follower means is kept in engagement with the guide track over the entire range of movement of the lifting lever.

19. Sliding and lifting roof according to claim 1, wherein the coupling between the lifting lever and the sliding retaining bracket forms a three point contact that is substantially free of play at least in an initial range of cover movements from said closed position.

20. Sliding and lifting roof according to claim 19, comprising means for placing said coupling under a slight pretensioning.

* * * * *